United States Patent [19]

Gunther et al.

[11] 4,077,961
[45] Mar. 7, 1978

[54] YELLOW TO BLUE DYESTUFFS OF THE BENZO-BENZIMIDAZO(1,2-a-)-QUINOLINE SERIES, PROCESS FOR THEIR MANUFACTURE, AND THEIR USE

[75] Inventors: Dieter Günther, Kelkheim; Theodor Papenfuhs, Frankfurt am Main, both of Germany

[73] Assignee: Hoechst Aktiengesellschaft, Frankfurt am Main, Germany

[21] Appl. No.: 801,464

[22] Filed: May 31, 1977

[30] Foreign Application Priority Data

Jun. 5, 1976   Germany ............................ 2625518

[51] Int. Cl.² .................... C09B 17/04; C07D 471/16
[52] U.S. Cl. .................................. 260/281 P; 8/1 D; 106/288 Q
[58] Field of Search .................................. 260/281 P

[56] References Cited
U.S. PATENT DOCUMENTS 3,935,226   1/1976   Jordon, Jr. ............................ 260/282

Primary Examiner—Donald G. Daus
Assistant Examiner—Mark L. Berch
Attorney, Agent, or Firm—Connolly and Hutz

[57] ABSTRACT

Compounds of the formula

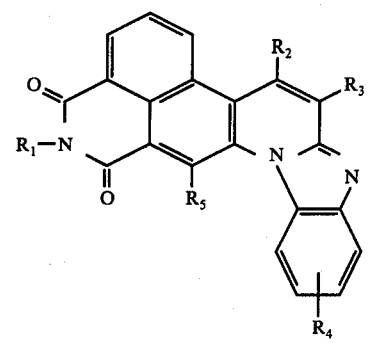

in which $R_1$ represents hydrogen, lower alkyl, lower alkoxy, lower alkylene or cycloalkyl-$C_3$—$C_6$, $R_2$ represents hydrogen, hydroxyl or lower alkoxy, $R_3$ represents cyano, carboxyl, —COO-lower alkyl,

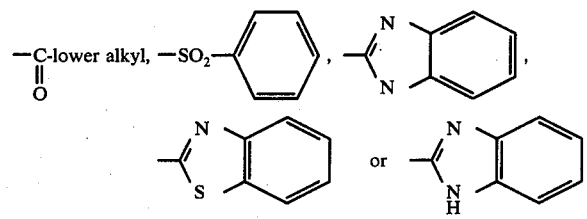

$R_4$ represents hydrogen or nitro, and $R_5$ represents hydrogencyano or carboxyl, these compounds representing yellow to blue dyestuffs, serving as textile dyestuffs, pigments or fluorescent dyestuffs dependent on the specific definitions of $R_1$ to $R_5$ within the given definitions more above.

1 Claim, No Drawings

YELLOW TO BLUE DYESTUFFS OF THE BENZO-BENZIMIDAZO(1,2-a)-QUINOLINE SERIES, PROCESS FOR THEIR MANUFACTURE, AND THEIR USE

The present invention relates to novel dyestuffs of the formula (1)

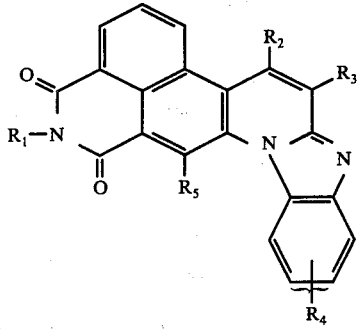

wherein $R_1$ is a hydrogen atom or a lower alkyl group, optionally substituted by halogen atoms, for example chlorine or bromine atoms, and/or lower alkoxy groups; furthermore a cycloalkyl-$C_3$—$C_6$ or phenyl group; $R_2$ is a hydrogen atom, a hydroxy, lower alkoxy, cyano, carboxyl, —COO lower alkyl, carboxylic acid amide,

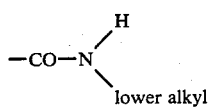

or —CO—N(lower alkyl)$_2$; $R_3$ is a sulfophenyl, cyano, carboxyl, —COO lower alkyl or an optionally functionally modified acetyl group, furthermore a benzoxazolyl, benzimidazolyl, N-methylbenzimidazolyl or thiazolyl group; $R_4$ is a hydrogen or halogen atom, for example a chlorine or bromine atom, a nitro, amino, lower alkylamino, lower alkoxyamino, acylamino or sulfonic acid group; and $R_5$ is a hydrogen atom, a cyano, carboxy, —COO lower alkyl, carboxylic acid amide,

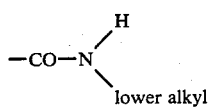

or —CO—N(lower alkyl)$_2$ group; furthermore to a process for their manufacture, and to their use for dyeing lacquers, natural or synthetic fiber materials, sheets films, ribbons or molded articles.

By "lower" in the definition of the substituents $R_1$ through $R_5$ in connection with aliphatic radicals, there are to be understood radicals having from 1 to 6, preferably 1 to 4, carbon atoms.

By "functionally modified" acetyl groups there are to be understood the hydrogenated forms thereof, such as the β-hydroxyethyl or ethyl group, and the oxime, hydrazone or anile groupings formed by condensation with hydroxylamine, hydrazine or aromatic primary amines.

Examples of preferred individual compounds are the following formulae:

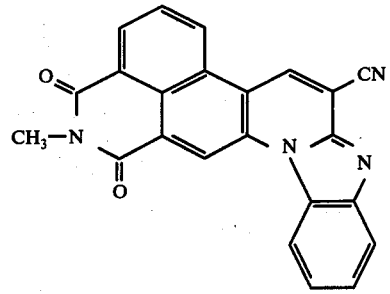

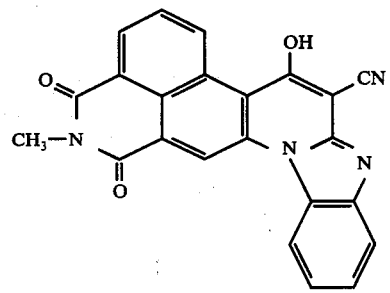

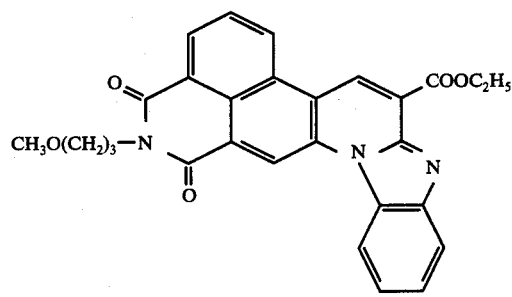

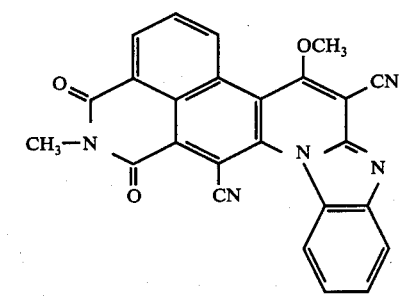

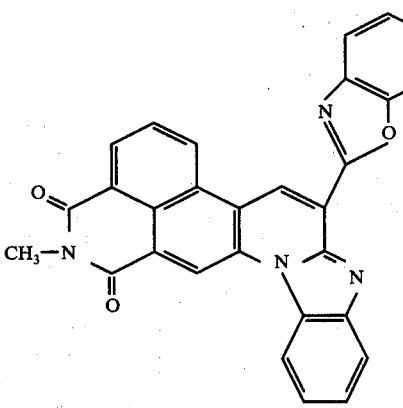

-continued

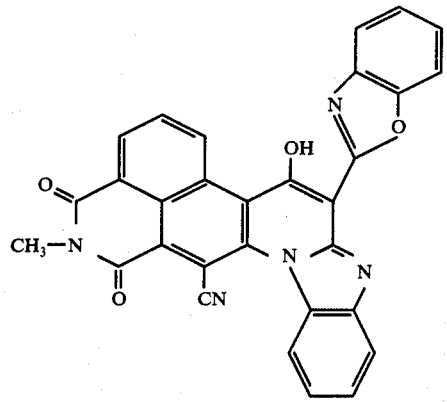

The compounds of the cited formula (1) are prepared by condensing an aldehyde of the formula (2)

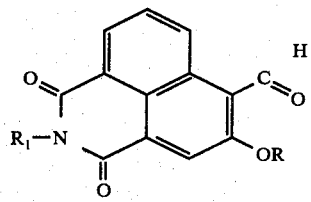

wherein R is a hydrogen atom or a lower alkyl group, and $R_1$ is as defined for formula (1), with a methylene-benzimidazole of the formula (3)

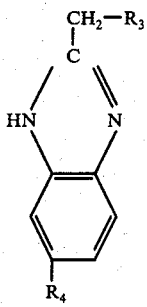

wherein $R_3$ and $R_4$ are as defined for formula (1), with the exception of —$NH_2$ for $R_4$, with the proviso that in the case where $R_4$ in the formula (1) is the —$NH_2$ group, condensation is carried out with a compound of the formula (3) wherein $R_4$ is a nitro or acylamino group and subsequently the nitro group is reduced, preferably with iron in an acidic medium, or the acylamino group is saponified; and, in the case where $R_2$ and $R_5$ in the formula (1) are not hydrogen atoms, treating the condensation products obtained in solution or suspension in aprotic solvents, for example dimethyl sulfoxide, dimethyl formamide, acetonitrile or sulfolane, at temperatures of from about 20° to about 150° C, a. with alkali metal salts of nucleophilic anions, for example alkali metal cyanides such as sodium or potassium cyanide, in the presence of a hydride acceptor, for example a halocyanide or iodocyanide, with exclusion of oxygen (when the treatment is carried out with the stoichiometric amount of nucleophilic compound, $R_2$ only becomes a cyano group; in the case of using the doubly stoichiometric amount $R_2$ and $R_5$ become cyano groups); or b. with the cited alkali metal cyanides of nucleophilic anions in the presence of air or oxygen (when the treatment is carried out with the stoichiometric amount of nucleophilic compound $R_2$ only becomes a hydroxyl group, in the case of using the doubly stoichiometric amount, $R_2$ becomes a hydroxy group and $R_5$ a nitrile group);

and optionally saponifying subsequently in known manner the nitrile groups introduced for $R_2$ and $R_5$ according to (a) or (b) either partially to carbonamide groups or completely to carboxyl groups; and optionally alkylating in known manner the carbonamide groups so obtained either partially or completely, or esterifying in known manner the carboxyl groups obtained; or etherifying in known manner the hydroxyl group introduced for $R_2$ according to (b), for example with an alkyl halide.

In the benzimidazoles of formula (3), the 5- and 6-positions as well as the nitrogen atoms in the imidazole ring are equivalent. Thus, isomer mixtures or unitary compounds may be formed in the condensation of the compounds of formula (2) with the compounds of formula (3). Since, therefore, the position of $R_4$ in the molecule of formula (1) cannot be fixed from the start, the position of $R_4$ in formula (1) has been indicated as above.

The aldehydes of the formula (2) cited may be prepared easily according to the process described in German Offenlegungsschrift No. 24 36 032.

The benzimidazoles of the formula (3) cited may be prepared according to known methods from o-phenylene diamine derivatives and the correspondingly substituted acetic acids or the acetic acids with functionally modified carboxyl group or acetic acid ester.

The condensation of the compounds of the formulae (2) and (3) is advantageously carried out in a solvent normally serving as water entrainer, preferably in an aromatic hydrocarbon, especially toluene, xylene, chlorobenzene or dichlorobenzene, or in a mixture of such solvents, for example dimethyl formamide, N-methyl-pyrrolidone or dimethyl sulfoxide, as solubilizer. Generally, stoichiometric amounts of the compounds of the formulae (2) and (3) are used; sometimes, however, an excess of aldehyde of formula (2), preferably of up to 5%, is advantageously used. The reaction is generally carried out under normal pressure, at temperatures of from 80° to 200° C, with addition of catalytic amounts of, for example, piperidine acetate, sulfuric acid, p-toluenesulfonic acid or boric acid. Normally, from 0.1 to 5% by weight, preferably 0.5 to 2% by weight, relative to the aldehyde of formula (2), are employed.

The compounds of the formula (1) crystallize generally from the solvents used and may thus be separated easily in pure form. The dyestuffs formed are isolated in all cases by cooling and suction-filtration, optionally after concentration of the solvent.

The compounds of the invention are yellow to blue dyestuffs which, depending on the substitution within the indicated scope of definitions for $R_1$, $R_2$, $R_3$, $R_4$ and $R_5$, are textile dyestuffs, pigments or fluorescing dyestuffs. The following materials, may, for example, be dyed or printed with the novel dyestuffs: lacquers, natural or synthetic fiber materials, for example from natural or regenerated cellulose, acetyl cellulose, natural or synthetic poylamides, such as wool, silk, polyamide-6 and -66, fibers of polyesters, polyolefins, polyvinyl chloride, polystyrene or polyacrylonitrile, and sheets, films, ribbons or molded articles made from the above materials. The compounds of the invention which are water-insoluble may be advantageously applied in a form dissolved in organic solvents, or in aqueous dispersion, preferably with addition of one of the usual dispersion agents.

The amount of compounds of the formula (1) to be used relative to the material to be dyed may vary within wide limits, depending on the intended application. It may be easily found out by tests and is generally from about 0.1 to 2% by weight.

The following Examples illustrate the invention:

EXAMPLE 1

54.5 g (0.2 mol) of benzimidazol-2-yl-phenylsulfone, 51.2 g (0.2 mol) of 3-hydroxy-N-methylnaphthalimido-4-aldehyde and 1 g of piperidine acetate in 350 ml of toluene and 50 ml of dimethyl formamide are heated to boiling with agitation. The water formed is eliminated. After 4 hour refluxing with agitation, 7.8 ml of water are formed. Subsequently, the batch is cooled to room temperature, suction-filtered and washed with acetonitrile. After drying, 84.5 g (86% of the theoretical yield) of an orange-red dyestuff having the formula

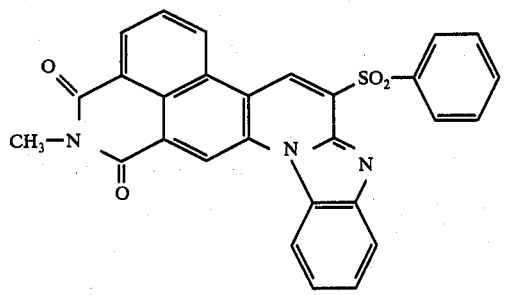

are obtained.

$C_{28}H_{17}N_3O_4S$; Molecular weight (MW) 491.51
Mass spectrum: MW 491

EXAMPLE 2

4.9 g (10 mmols) of the dyestuff obtained according to Example 1 are heated to 90° C with agitation in dimethyl sulfoxide. While oxygen is passed through, 1 g (20 mmols) of sodium cyanide, dissolved in 40 ml of dimethyl sulfoxide, is added dropwise within 1 hour. Agitation is then continued at 90° C for 5 hours. After cooling, a small amount of residue (about 0.2 g) is suction-filtered, and 15 ml of 2 N hydrochloric acid are added to the mother liquor. The precipitated product is suction-filtered, washed with methanol and dried. 3.2 g (78% of theory) of a dyestuff fluorescing in a red-violet color in solution and having the following formula is obtained:

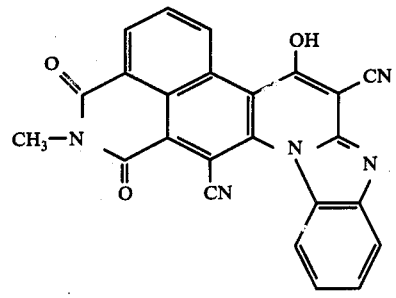

$C_{24}H_{11}N_5O_3$: MW 417.37
Mass spectrum: MW 417
Absorption: $\lambda_{max}$ 571
Fluorescence: $\lambda_{max}$ 625
Quantum yield: 0.74

When the dyestuff obtained is processed with toluene sulfamide, p-formaldehyde and melamine to form a pigment, and when this pigment is added to a lacquer on the basis of acrylate resin, this lacquer yields brilliant, red coatings having a good fastness to solvents.

EXAMPLE 3

When operating as described in Example 2, but using only half of the amount of sodium cyanide, there is obtained, after cooling and suction-filtration, a residue of 1.2 g (30% of theory) of a dyestuff having an orange fluorescence and corresponding to the following formula:

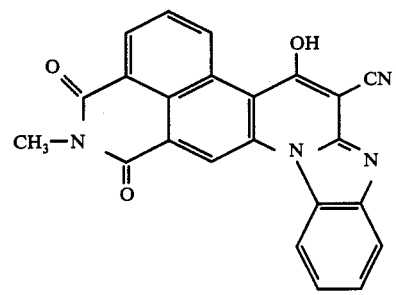

$C_{23}H_{12}N_4O_3$: MW 392.35
Mass spectrum: MW 392
Absorption: $\lambda_{max}$ 521
Fluorescence: $\lambda_{max}$ 594

The dyestuff so obtained, on dyeing of polyamide fibers, yields brilliant orange dyeings having good utility fastnesses.

EXAMPLE 4

17.5 g (65 mmols) of 3-hydroxy-N-methylnaphthalimido-4-aldehyde and 12.8 g (73.4 mmols) of benzimidazol-2-yl-acetone are dissolved, while stirring and heating, in 200 ml of toluene and 10 ml of dimethyl formamide. After having added 0.7 of piperidine acetate, the batch is refluxed with agitation for 4 hours, and the water formed is eliminated via a separator (2.5 ml of water are formed). The reaction mixture is cooled, the precipitated product is suction-filtered, washed with methanol and dried. 24.8 g (97% of theory, relative to the aldehyde) of a red dyestuff having the following formula are obtained:

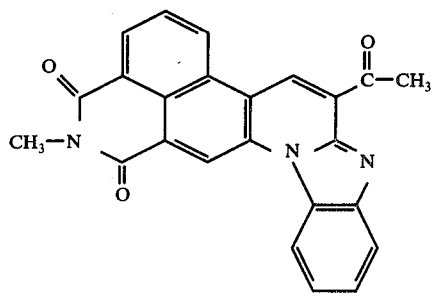

$C_{24}H_{15}N_3O_3$: MW 393.38
Mass spectrum: MW 393
Absorption: $\lambda_{max}$ 553

An alkyd/melamine resin lacquer dyed with this dyestuff yields clear orange coatings having a good transparency and purity as well as fastness to recoating and light.

EXAMPLE 5

40.8 g (0.15 mol) of benzimidazol-2-yl-phenylsulfone, 47.0 g (0.15 mol) of 3-hydroxy-N-(3-methoxy)-propyl-naphthalimido-4-aldehyde and 1.5 g of piperidine acetate are heated for 7 hours in a mixture of 300 ml of toluene and 20 ml of dimethyl formamide in a water separator. 6 ml of water are eliminated. After cooling to room temperature, the product is suction-filtered and washed with methanol. The still wet product is suspended in 700 ml of dimethyl formamide and heated again to boiling. After cooling to room temperature, the product is again suction-filtered, washed with methanol and dried at 80° C under reduced pressure. 70 g (85% of theory) of a red-orange dyestuff having the following formula are obtained:

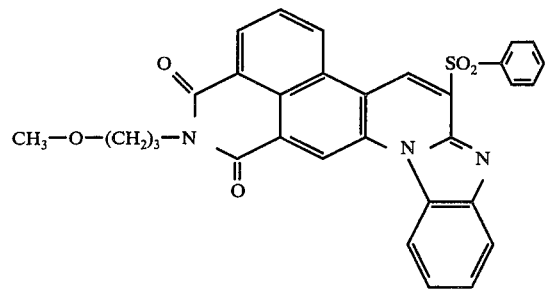

$C_{31}H_{23}N_3O_5S$: MW 549.58
m.p.: 327° – 329° C
mass spectrum: MW 549

EXAMPLE 6

5.5 g (10 mmols) of the compound prepared according to Example 5 in 80 ml of dimethyl sulfoxide are heated to 60° C with 1.25 g (25 mmols) of sodium cyanide and gassed for 2 hours with oxygen. Subsequently, the batch is cooled, filtered (no residue), and the mother liquor is combined with 20 ml of 2N hydrochloric acid. The residue precipitated thereby is suction-filtered, washed with alcohol and dried. 4 g (84% of theory) of a red-violet dyestuff having the following formula is obtained:

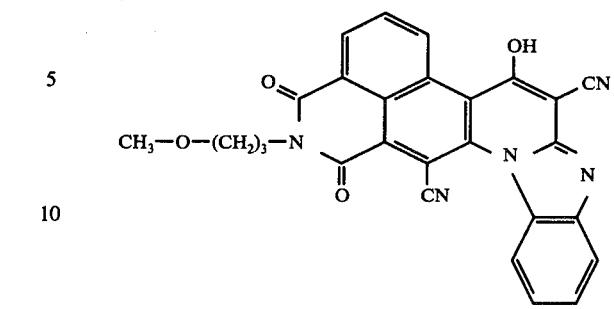

$C_{27}H_{17}N_5O_4$: MW 475.45
Mass spectrum: MW 475
Absorption: $\lambda_{max}$ 570
Fluorescence: $\lambda_{max}$ 625

When dyeing polyester fiber materials, this dyestuff yields brilliant violet dyeings having good utility fastnesses.

EXAMPLE 7

1 g (2.1 mmols) of the compound prepared according to Example 6, 0.6 g (4.35 mmols) of potassium carbonate and 0.41 ml (4.3 mmols) of dimethyl sulfate in 10 ml of N-methylpyrrolidone are stirred for 7 hours at room temperature and 1 hour at 60° C. After cooling, the batch is suction-filtered, washed with methanol and the residue is stirred with water. After repeated suction-filtration and washing, the dyestuff is dried. 0.8 g (77% of theory) of an orange product having the following formula is obtained:

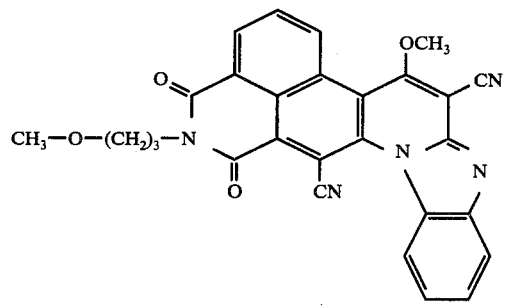

$C_{28}H_{19}N_5O_4$: MW 489.47
Mass spectrum: MW 489
Absorption: $\lambda_{max}$ 524
Fluorescence: $\lambda_{max}$ 593

On polyester fiber materials, the dyestuff yields brilliant, red-orange dyeings having good fastness to heat setting and average fastness to light.

EXAMPLE 8

16.14 g (50 mmols) of 3-hydroxy-N-cyclohexyl-naphthalimido-4-aldehyde, 13.6 g (50 mmols) of benzimidazole-2-yl-phenylsulfone, and 0.5 g of piperidine acetate are heated for 5 hours to boiling in a water separator in a mixture of 100 ml of toluene and 10 ml of dimethyl formamide. 1.9 ml of water are formed. After cooling, the product is suction-filtered, washed with alcohol and dried. 19.3 g (69% of theory) of an organge dyestuff having the following formula are obtained:

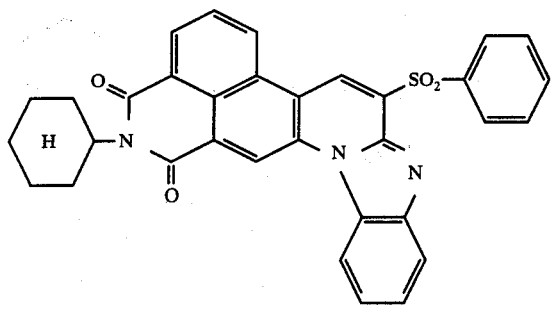

$C_{33}H_{25}N_3O_4S$: MW 559.62
Mass spectrum: MW 559

EXAMPLE 9

28.2 g (0.105 mol) of 3-methoxy-N-methylnaphthalimido-4-aldehyde and 16.5 g (0.105 mol) of benzimidazol-2-yl-aceto-nitrile are dissolved in 200 ml of toluene and 30 ml of dimethyl formamide. After having added 1 g of piperidine acetate, the batch is refluxed for 1 hour under a nitrogen atmosphere, whereby 1.6 ml of water are eliminated. Subsequently, the toluene is distilled off with addition of 200 ml of o-dichlorobenzene. Heating at 170° C is continued for 4 hours, subsequently, the batch is cooled to room temperature, suction filtered and washed with acetonitrile. The wet residue is stirred with 300 ml of water, again suction-filtered and dried. 35.6 g (90% of theory) of a red pigment having the following formula are obtained:

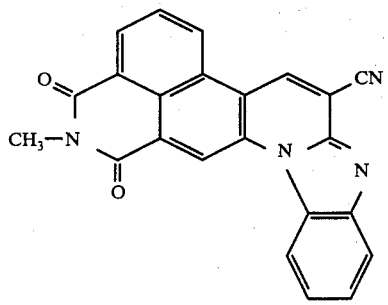

$C_{23}H_{12}N_4O_2$: MW 376.36
Mass spectrum: MW 376

When the dyestuff is incorporated into an alkyd-/melamine resin lacquer, the lacquer yields neutral red coatings having good transparency, resistance to influences of temperature, and fastnesses to recoating and to light.

EXAMPLE 10

3.8 g (10 mmols) of the compound prepared according to Example 9 are dissolved in 20 ml of concentrated sulfuric acid. Subsequently, 10 ml of water are added, which causes the temperature to rise to 105° C. The batch is heated to 120° C and stirring is continued at this temperature for 3 hours. Subsequently, the batch is poured onto ice, the precipitate is suction-filtered, washed to neutral with water and dried at 80° C over phosphorus pentoxide. 3.8 g (96% of theory) of pale red crystals having the following formula are obtained:

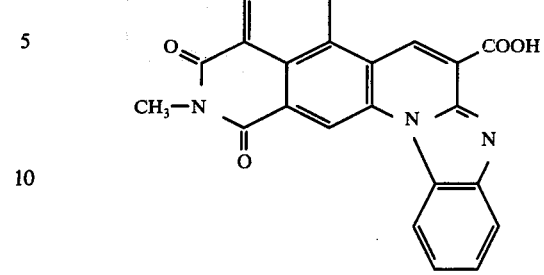

$C_{23}H_{13}N_3O_4$: MW 395.38

EXAMPLE 11

1.2 g (3 mmols) of the compound prepared according to Example 10 are stirred with 2.2 g (16 mmols) of potassium carbonate and 1.5 ml (16 mmols) of dimethyl sulfate in 80 ml of N-methylpyrrolidone, first for 6 hours at room temperature and subsequently for 1 hour at 60° C. The batch is then suction-filtered, washed with alcohol, and the residue is stirred with water, again suction-filtered and dried. 0.8 g (66% of theory) of an orange dyestuff having the following formula is obtained:

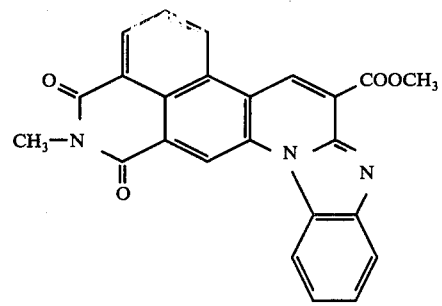

$C_{24}H_{15}N_3O_4$: MW 409.38
mass spectrum: MW 409
m.p.: 314° – 316° C decomp. (o-dichlorobenzene)
Absorption: $\lambda_{max}$ 445

EXAMPLE 12

3.8 (10 mmols) of the compound prepared according to Example 9, and 1.2 g (11 mmols) of o-aminophenol are heated in 30 g of polyphosphoric acid for 5 hours at 180° C under a nitrogen atmosphere. The batch is then poured onto ice and the solid residue is suction-filtered. Still wet, it is stirred into 100 ml of water and neutralized with 2 N sodium hydroxide solution. The residue is again suction-filtered, washed with water and dried. 4.1 g of a red powder are obtained which are boiled with 200 ml of o-dichlorobenzene. 2.5 g of residue remain which are identified has being starting material. The o-dichlorobenzene phase is removed under reduced pressure, the residue is stirred with alcohol, suction-filtered and recrystallized from dimethyl formamide. 0.5 g (31% of theory) of a red dyestuff having the following formula is obtained:

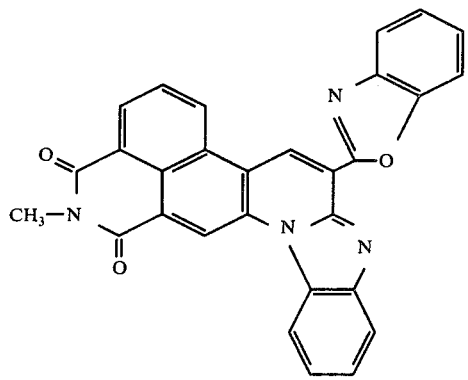

$C_{29}H_{16}N_4O_3$: MW 468.45
Mass spectrum: MW 468
Absorption: $\lambda_{max}456$
Fluorescence: $\lambda_{max}577$ On polyester fiber materials, the dyestuff yields brilliant, fluorescing orange dyeings having very good fastness to light and to heat setting.

EXAMPLE 13

2.55 g (10 mmols) of 3-hydroxy-N-methylnaphthalimido-4-aldehyde and 2.65 g of 1-benzimidazol-2-yl-1-benzothiazolyl-(2)-methane are heated for 6 hours at 130° C in 20 ml of dimethyl formamide and 0.1 g of piperidine acetate, with agitation and under a nitrogen atmosphere. After cooling, the batch is suction-filtered, washed with dimethyl formamide and dried under reduced pressure. 4.2 g (86.5% of theory) of an orange pigment having the following formula are obtained:

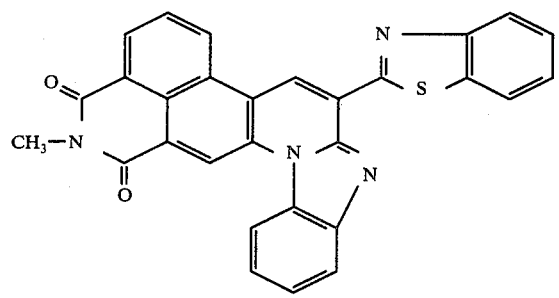

$C_{29}H_{16}N_4O_2S$: MW 484.52

Incorporated into alkyd/melamine resin, the lacquer so prepared yields orange-red dyeings having good fastnesses to recoating and to light as well as good resistance to influences of temperature.

EXAMPLE 14

12.75 g (50 mmols) of 3-hydroxy-N-methylnaphthalimido-4-aldehyde and 12.4 g (50 mmols) of methylene-bis benzimidazole-(2) are dissolved at boiling temperature in 100 ml of toluene and 30 ml of dimethyl formamide, and, after having added 0.5 g of piperidine acetate, heated for 5 hours in a water separator, thus eliminating 2.2 ml of water and precipitating the reaction product. After cooling, the product is suction-filtered, washed with acetonitrile and dried under reduced pressure. 19.7 g (84% of theory) of a red pigment having the following formula are obtained:

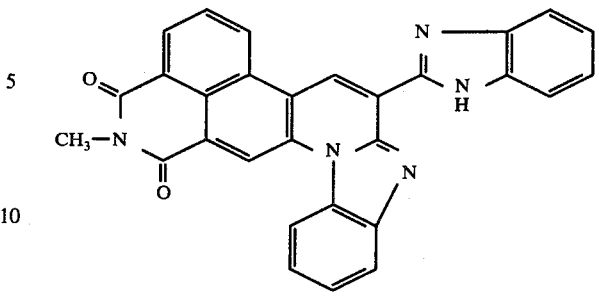

$C_{29}H_{17}N_5O_2$: MW 467.49
Mass spectrum: MW 467

We claim:
1. A compound of the formula

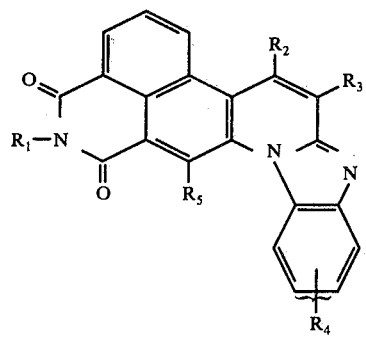

in which $R_1$ represents hydrogen, lower alkyl, lower alkoxy-lower alkylene- or cycloalkyl—$C_3$–$C_6$, $R_2$ represents hydrogen, hydroxyl or lower alkoxy, $R_3$ represents cyano, carboxyl, —COO-lower alkyl,

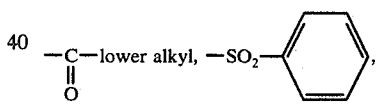

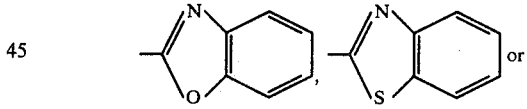

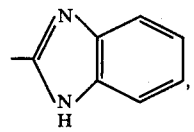

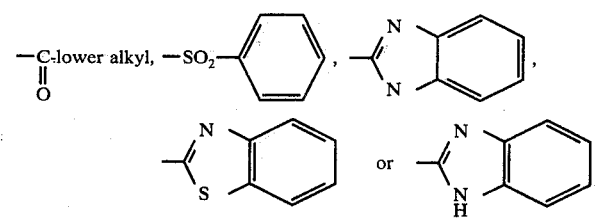

$R_4$ represents hydrogen or nitro, and $R_5$ represents hydrogen, cyano or carboxy.

* * * * *